(12) United States Patent
Asanovic et al.

(10) Patent No.: US 12,314,191 B2
(45) Date of Patent: May 27, 2025

(54) MEMORY PROTECTION FOR VECTOR OPERATIONS

(71) Applicant: SiFive, Inc., San Mateo, CA (US)

(72) Inventors: Krste Asanovic, Oakland, CA (US); Andrew Waterman, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 280 days.

(21) Appl. No.: 18/024,262

(22) PCT Filed: Sep. 1, 2021

(86) PCT No.: PCT/US2021/048634
§ 371 (c)(1),
(2) Date: Mar. 1, 2023

(87) PCT Pub. No.: WO2022/051345
PCT Pub. Date: Mar. 10, 2022

(65) Prior Publication Data
US 2023/0315649 A1   Oct. 5, 2023

Related U.S. Application Data

(60) Provisional application No. 63/073,916, filed on Sep. 2, 2020.

(51) Int. Cl.
*G06F 21/00*   (2013.01)
*G06F 9/30*   (2018.01)
(Continued)

(52) U.S. Cl.
CPC ...... *G06F 12/1458* (2013.01); *G06F 9/30036* (2013.01); *G06F 21/6218* (2013.01); *G06F 2212/1052* (2013.01)

(58) Field of Classification Search
CPC ............ G06F 12/1458; G06F 9/30036; G06F 21/6218; G06F 2212/1052; G06F 9/3455;
(Continued)

(56) References Cited

U.S. PATENT DOCUMENTS

| | | | |
|---|---|---|---|
| 9,906,360 B2 * | 2/2018 | Johnson | H04L 9/0631 |
| 2012/0254591 A1 * | 10/2012 | Hughes | G06F 9/3013 |
| | | | 712/205 |
| 2019/0095345 A1 * | 3/2019 | Zmudzinski | G06F 12/126 |

FOREIGN PATENT DOCUMENTS

KR    20090074395 A    7/2009

OTHER PUBLICATIONS

International search report for international application No. PCT/US2021/048634; Mailed Dec. 20, 2021; 15 pages.
(Continued)

*Primary Examiner* — Lisa C Lewis
(74) *Attorney, Agent, or Firm* — Kilpatrick Townsend & Stockton LLP

(57) ABSTRACT

Systems and methods are disclosed for memory protection for vector operations. For example, a method includes fetching a vector memory instruction using a processor core including a pipeline configured to execute instructions, including constant-stride vector memory instructions; partitioning a vector that is identified by the vector memory instruction into a subvector of a maximum length, greater than one, and one or more additional subvectors with lengths less than or equal to the maximum length; checking, using a memory protection circuit, whether accessing elements of the subvector will cause a memory protection violation; and accessing the elements of the subvector before checking, using the memory protection circuit, whether accessing elements of one of the one or more additional subvectors will cause a memory protection violation.

23 Claims, 7 Drawing Sheets

(51) Int. Cl.
*G06F 12/14* (2006.01)
*G06F 21/62* (2013.01)
*H04L 29/06* (2006.01)

(58) Field of Classification Search
CPC ....... G06F 2212/1016; G06F 2212/454; G06F 12/1441
See application file for complete search history.

(56) References Cited

OTHER PUBLICATIONS

Decoupled Vector Architectures by Roger Espasa and Mateo Valero; Mar. 1996; 11 pages.
RISC-V: an Open Instruction Set Architecture by Scott Thorton; Feb. 22, 2018; 11 pages.
RISC-V "V" Vector Extension version 0.8-draft-20191117; Nov. 17, 2019; 91 pages.
The SiFive Vector Processor by Mark Throndson, SiFive Senior Director, RISC-V Core IP Prod Mgmt; Dec. 11, 2019; 12 pages.

* cited by examiner

MEMORY PROTECTION FOR VECTOR OPERATIONS

CROSS-REFERENCE TO RELATED APPLICATIONS

This application is a 371 of International Application No. PCT/US2021/048634, filed on Sep. 1, 2021, which claims priority to U.S. Provisional Application No. 63/073,916, filed on Sep. 2, 2020, the entire contents of which are hereby incorporated by reference.

TECHNICAL FIELD

This disclosure relates to memory protection for vector operations.

BACKGROUND

Researchers, including Roger Espasa and Mateo Valero, have investigated scheme to record strided operations as base+range, and scatter/gather with the whole address range for purposes of detecting memory hazards for program ordering.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Overview

Figure 1:
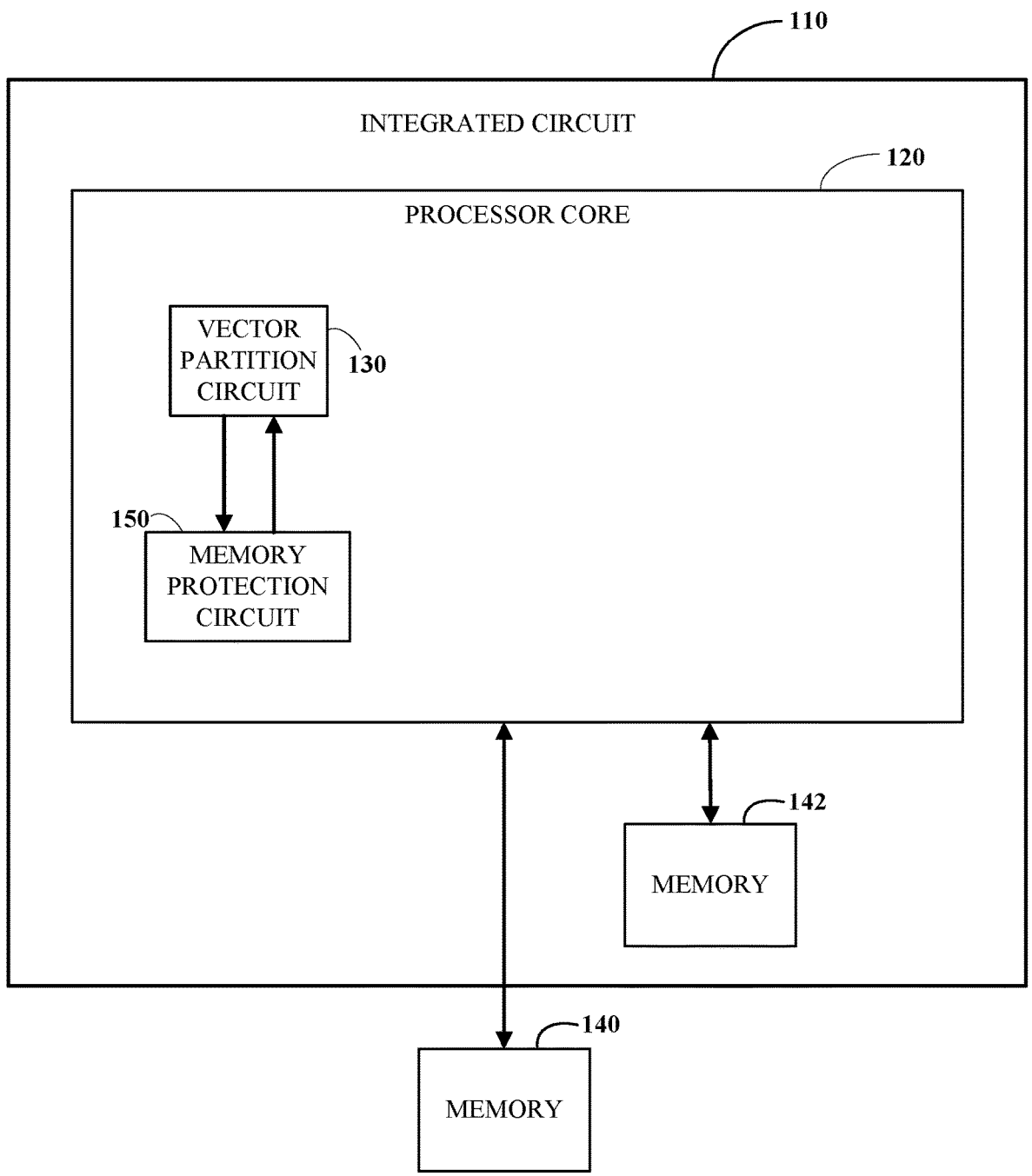
FIG. 1 is a block diagram of an example of an integrated circuit supporting memory protection for vector operations.

Described herein are systems and methods for memory protection for vector operations. Some processor architectures may implement in-order or out-of-order vector machines. Vector memory instructions can take several cycles to execute. Even for an in-order vector machine it is advantageous to allow a following instruction to begin execution before current vector instruction has completed, even when both access memory and can cause exceptions. It may also be useful to determine if a following memory instruction has any read after write (RAW), write after read (WAR), or write after write (WAW) hazards with the current vector memory instruction.

To enable fast scan of vector for memory protection violations, it is advantageous to check a vector memory instruction for any memory protection violations at high speed with minimal hardware. Each vector memory instruction may touch many elements at many different addresses and may take many cycles to execute. When the address range is known at instruction issue (e.g., for a vector with unit-stride or a greater constant stride), then the possible range of addresses can be calculated at issue time as:

$$Range=[Base, Base+(VL-1)*stride+(bytes\text{-}per\text{-}element-1)]$$

where Base is a base address in memory of the vector and VL is an active vector length of the instruction. Hardware in a processor architecture may then be optimized to check only the range not each element address within the range. When addresses are not known until execution time (e.g., for scatter-gather instructions) conventional designs would be conservative and assume any address could be touched.

For unit-stride or other constant-stride vector memory instructions, if C is the number of individual hardware memory checks possible per cycle, a conventional system would only process C elements per cycle. Some processor architectures and methods described herein may increase a number of elements processed per cycle, K, for a given C to allow greater throughput from the same hardware. Checking fewer memory addresses/cycle (e.g., C=1 or C=2) allows for simpler hardware, higher frequency, and/or lower power.

In the case where C=2, performance may be improved by choosing K>2 based on the stride value and protection granule such that still only two memory addresses need to be checked for the group, where the two memory addresses correspond to the first and last byte address touched by the group. For example, maximum number of elements per group or subvector may be determined as:

$$K=f1(stride, protection\text{-}granule, machine\text{-}width)$$

where f1( ) is an arbitrary function mapping the stride, width, and protection granule to a maximum number of elements. In some implementations, K may be constrained to takes values of powers of two to simplify the hardware.

In the case where C=1, the checks may be optimized by considering the base address also (e.g., K=f2(base, stride, protection-granule, machine-width)), such that checking only C=1 memory address is sufficient for the group with a size K>=1. The range of addresses touched by the K-element group may be constrained to be all on a single protection granule, i.e., the last byte address is on the same protection granule as the base address. In this C=1 case, either all the elements would raise a protection violation, or none of the elements would raise a protection violation, which simplifies exception handling.

In some architectures, scatter/gather vector memory operations may be contained within a memory-protection granule. If the width of the address index elements is constrained to be 8b or 16b, or any known value less than full address width, then the range is constrained independent of the data values. For unsigned n-bit indices:

$$Range=[base, base+2^n-1+bytes\text{-}per\text{-}element-1]$$

Independent of the base address, if the index range would fit inside a single protection granule, then can use C=2 protection checks to check entire range (e.g., check first and last byte address in range). If the base is known, then can optimize to use only a single memory check (C=1) when the base and last byte of range would fall in the same protection granule.

In some architectures, if n is unknown or large, can still optimize memory protection violation checks for scatter/gather instructions by memorizing the range of addresses that might be referenced when a vector register is used as the index vector for a scatter/gather instruction. When a vector register is written, the smallest and largest elements within the vector may be recorded. It is then guaranteed that the elements implicated by the instruction are stored within the range:

Range=[base+min,base+max+bytes-per-element−1]

Depending on the values of base, min, and max, the memory protection checks may be handled efficiently on C=2 or C=1 machines.

As used herein, the term "memoize" means that the min/max are computed on the fly as a vector register is written and recorded in a microarchitectural structure (e.g., registers) on the side. The granularity at which the information is memoized may be finer (e.g., subpieces of vector registers) or coarser (e.g., groups of vector registers).

In some implementations, to save space versus having a side structure to hold minimax, but still compute min/max with fast and small circuitry, an approximation that min= (bitwise AND of all elements in the vector of indices) and max=(bitwise OR of all elements) may be used. If VL is less than the maximum possible VL, leaving tail elements undisturbed, or if some elements are masked off and left undisturbed, then the previous range is extended, rather than overwritten. If VL is less than the maximum possible VL, with tail-agnostic policy setting tail elements to their maximum possible value, or if some elements are masked off, with mask-agnostic policy setting masked-off elements to their maximum possible value, then the memoized upper bound is set to its maximum possible value. If VL is less than the maximum possible VL, with tail-agnostic policy setting tail elements to their minimum possible value, or if some elements are masked off, with mask-agnostic policy setting masked-off elements to their minimum possible value, then the memoized lower bound is set to its minimum possible value.

When min/max are known to a programmer, more efficient hazard checks may also be implemented. Instead of recording min/max, can have explicit arguments to an instruction for min/max. Can assume all elements lie within min/max, then raise exception at runtime if assumption is violated.

In some implementations, the techniques for memory protection for vector operations may be used to realize one or more advantages over conventional processors. For example, the structures and techniques described herein may enabling fast memory protection scanning for vector memory operations using a simple memory protection circuit that has small circuit area and power consumption.

As used herein, the term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function.

Details

FIG. 1 is a block diagram of an example of an integrated circuit 110 for executing instructions using memory protection for vector memory operations. The integrated circuit 110 includes a processor core 120. The processor core 120 includes a vector partition circuit 130 configured to partition vectors in memory into subvectors to facilitate fast memory protection scanning for vector memory instructions. The processor core 120 is configured to fetch instructions from and access data stored in a memory 140 external to the integrated circuit 110 and/or a memory 142 internal to the integrated circuit 110. The integrated circuit 110 includes a memory protection circuit 150, which may be configured to perform memory protection checks for one or more addresses with a protection granule. The integrated circuit 110 may provide advantages over conventional processor architectures, such as, for example, enabling fast memory protection scanning for vector memory operations, using a simple memory protection circuit that has small circuit area and power consumption. For example, the integrated circuit 110 may implement the process 400 of FIG. 4. For example, the integrated circuit 110 may implement the process 500 of FIG. 6. For example, the integrated circuit 110 may implement the process 600 of FIG. 6. For example, the integrated circuit 110 may implement the process 700 of FIG. 7.

The integrated circuit 110 includes a processor core 120, which may include a pipeline configured to execute instructions, including constant-stride vector memory instructions. The pipeline stages, such as fetch, decode, rename, dispatch, issue, execute, memory access, and write-back stages. For example, the processor core 120 may be configured to execute instructions of a RISC V instruction set.

The processor core 120 may be configured to fetch instructions from a memory 140 external to the integrated circuit 110 that stores instructions and/or data. The processor core 120 may be configured to access data in the memory 140 in response to instructions, including vector memory instructions (e.g., the vector load instruction 310 or the vector store instruction 330). For example, the processor core 120 may access data in the memory directly or via one or more caches. The processor core 120 may also be configured to fetch instructions from a memory 142 internal to the integrated circuit 110 that stores instructions and/or data. The processor core 120 may be configured to access data in the memory 142 in response to instructions, including vector memory instructions. Although not shown in FIG. 1, the integrated circuit 110 may include multiple processor cores in some implementations.

The integrated circuit 110 includes a memory protection circuit 150 configured to check for memory protection violations with a protection granule. The memory protection circuit 150 may allow the privileged software to define memory regions and assign memory access permission to each of them. The protection granule of the memory protection circuit 150 limits the size and thus resolution of these memory regions with associated access permissions. For example, the protection granule may correspond to pages of memory (e.g., 4 kB or 8 kB pages). In some implementations, the memory protection circuit 150 also specifies memory attributes for these memory regions, which may specify the ordering and merging behaviors of these regions, as well as caching and buffering attributes. The memory protection circuit 150 may be used to monitor transactions, including instruction fetches and data accesses by the processor core 120, which can trigger a fault exception when a memory protection violation is detected. For example, an attempt to access unauthorized memory may result in a hardware fault (e.g., a segmentation fault, storage violation exception, or abnormal termination of the offending process). The memory protection circuit 150 may serve to prevent a process from accessing memory that has not been allocated to it, which may prevent a bug or malware within a process from affecting other processes, or the operating system. In this example, the memory protection circuit 150 is part of the processor core 120. In some implementations, the memory protection circuit 150 may be outside of the processor core 120 (e.g., part of an external memory system).

The memory protection circuit 150 may be of various sizes and complexities. In some implementations, the memory protection circuit 150 is configured to check two addresses per clock cycle. For example, the memory protection circuit 150 may have two address ports that allow it to receive two addresses and independently check both of the two addresses in memory for a memory protection violation during a single clock cycle. For example, an address may be checked by comparing a memory protection key or ring for a memory region that includes the address to a memory protection key or ring number associated with a process that is being executed by the processor core 120 and is attempting to access the memory at the address. In some implementations, the memory protection circuit 150 is configured to check a single address per clock cycle, and thus may occupy less circuit area and consume less power. In some implementations, the memory protection circuit 150 may have more than two address ports or otherwise be configured to check more than two addresses or ranges of addresses per clock cycle for memory protection violations.

The integrated circuit 110 includes a vector partition circuit 130. The vector partition circuit 130 may be configured to partition a vector being accessed in memory (e.g., the memory 140 or the memory 142) to allow for memory protection scanning for subvectors to be performed in parallel with memory access for other subvectors of the vector and increase the throughput for vector memory instructions. The vector partition circuit 130 may be configured to partition a vector that is identified by a vector memory instruction into a subvector of a maximum length, greater than one, and one or more additional subvectors with lengths less than or equal to the maximum length. In some implementations, the maximum length may be determined based on the protection granule and a stride of a vector that is identified by a vector memory instruction (e.g., the vector load instruction 310 or the vector store instruction 330). For example, vector partition circuit 130 may be configured to determine the maximum length such that the maximum length is directly proportional to the protection granule and inversely proportional to the stride of the vector. For example, the maximum length may be determined as g/s, where g is the protection granule (e.g., in bytes) and s is the stride (e.g., in bytes) of the vector. In some implementations, the maximum length is constrained to be a power of two (e.g., the largest power of two less than or equal to g/s). The maximum length may also depend on the element width of the vector. The maximum length may also depend on the machine width of the processor core 120, i.e., how many elements of a vector the processor core can process per clock cycle. For example, maximum length may be determined as min(w, (g/s)), where w is the machine width of the processor core 120. For example, the vector may be a unit-stride vector such that the stride is one. For example, the vector may have a constant stride that is greater than one (e.g., the stride may correspond to the length of a row in a matrix to access a column vector of a matrix data structure that is stored as a sequence of rows). The vector partition circuit 130 may be configured to check, using the memory protection circuit 150, whether accessing elements of the subvector will cause a memory protection violation. The vector partition circuit 130 may be configured to access the elements of the subvector before checking, using the memory protection circuit 150, whether accessing elements of one of the one or more additional subvectors will cause a memory protection violation. For example, the vector partition circuit 130 may be part of an execution stage of a pipeline of the processor core 120.

In some implementations, the memory protection circuit 150 is configured to check two addresses per clock cycle, and the vector partition circuit 130 checks whether accessing elements of the subvector will cause a memory protection violation by inputting, during a single clock cycle, an address of a first element of the subvector and an address of a last element of the subvector to the memory protection circuit 150. In some implementations, the memory protection circuit 150 is configured to check a single address per clock cycle, and the vector partition circuit 130 is configured to determine the maximum length based on a base address of the vector. For example, taking the base address for vector into account may enable the determination of a partition of the vector into subvectors aligned with protection granule boundaries in memory to ensure that a subvector is contained within a single protection granule and thus can be checked for memory protection violations with a single reference to the memory protection circuit 150 using an address associated with any of the elements of the subvector.

For example, the integrated circuit 110 may be configured to, responsive to detection of a memory protection violation associated with an element of one of the one or more additional subvectors, raise an exception. In some implementations, raising the exception may halt execution in the processor core 120. In some implementations, raising the exception may cause a page to be brought in from a disk to the memory 140 or the memory 142.

Figure 2:
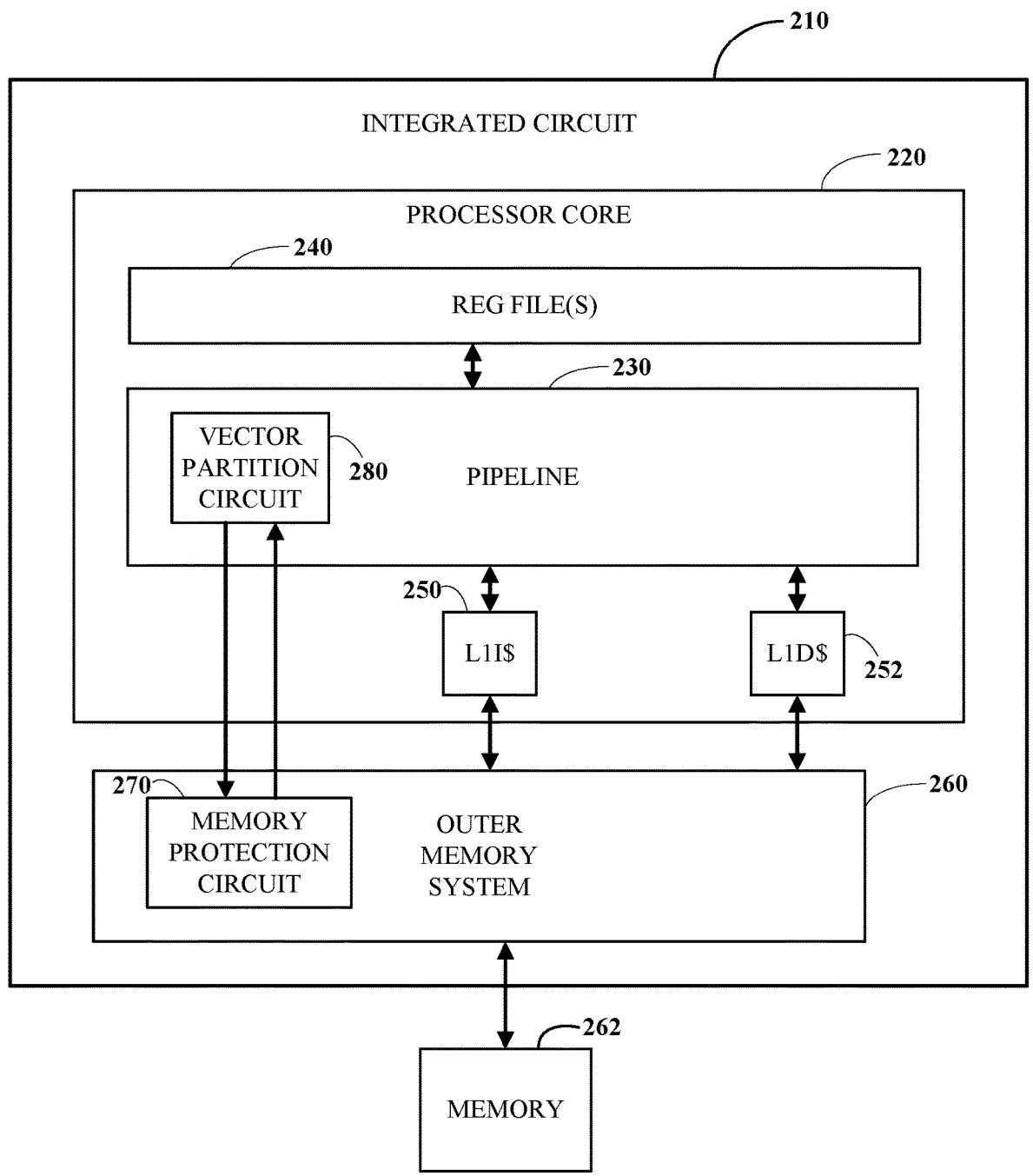
FIG. 2 is a block diagram of an example of an integrated circuit supporting memory protection for vector operations.

FIG. 2 is a block diagram of an example of an integrated circuit 210 for executing instructions using memory protection for vector operations. The integrated circuit 210 includes a processor core 220. The processor core 220 includes a processor pipeline 230 that includes a vector partition circuit 280 configured to partition vectors in memory into subvectors to facilitate fast memory protection scanning for vector memory instructions. The processor core 220 includes one or more register files 240, which may include vector registers. The processor core 220 includes an L1 instruction cache 250 and an L1 data cache 252. The integrated circuit 210 includes an outer memory system 260, which may include memory storing instructions and data and/or provide access to a memory 262 external to the integrated circuit 210 that stores instructions and/or data. The outer memory system 260 includes a memory protection circuit 270, which may be configured to perform memory protection checks for one or more addresses with a protection granule. The integrated circuit 210 may provide advantages over conventional processor architectures, such as, for example, enabling fast memory protection scanning for vector memory operations, using a simple memory protection circuit that has small circuit area and power consumption. For example, the integrated circuit 210 may implement the process 400 of FIG. 4. For example, the integrated circuit 210 may implement the process 500 of FIG. 6. For example, the integrated circuit 210 may implement the process 600 of FIG. 6. For example, the integrated circuit 210 may implement the process 700 of FIG. 7.

The integrated circuit 210 includes a processor core 220 including a pipeline 230 configured to execute instructions, including constant-stride vector memory instructions. The pipeline 230 includes one or more fetch stages that are configured to retrieve instructions from a memory system of the integrated circuit 210. For example, the pipeline 230 may fetch instructions via the L1 instruction cache 250. The pipeline 230 may include additional stages, such as decode, rename, dispatch, issue, execute, memory access, and writeback stages. For example, the processor core 220 may include a pipeline 230 configured to execute instructions of a RISC V instruction set.

The integrated circuit 210 includes one or more register files 240 for the processor core 220. The one or more register files 240 may store part or all or an architectural state of the processor core 220. For example, the one or more register files 240 may include a set of vector registers. For example, the one or more register files 240 may include a set of control and status registers (CSRs) For example, the one or more register files 240 may include a set of scalar registers.

The integrated circuit 210 includes an L1 instruction cache 250 for the processor core 220. The L1 instruction cache 250 may be a set-associative cache for instruction memory. To avoid the long latency of reading a tag array and a data array in series, and the high power of reading the arrays in parallel, a way predictor may be used. The way predictor may be accessed in an early fetch stage and the hit way may be encoded into the read index of the data array. The tag array may be accessed in later fetch stage and may be used for verifying the way predictor.

The integrated circuit 210 includes an L1 data cache 252 for the processor core 220. For example, the L1 data cache 252 may be a set-associative VIPT cache, meaning that it is indexed purely with virtual address bits VA[set] and tagged fully with all translate physical address bits PA[msb:12]. For low power consumption, the tag and data arrays may be looked up in serial so that at most a single data SRAM way is accessed. For example, the line size of the L1 data cache 252 may be 64 Bytes, and the beat size may be 26 Bytes.

The integrated circuit 210 includes an outer memory system 260, which may include memory storing instructions and data and/or provide access to a memory 262 external to the integrated circuit 210 that stores instructions and/or data. For example, the outer memory system 260 may include an L2 cache, which may be configured to implement a cache coherency protocol/policy to maintain cache coherency across multiple L1 caches. Although not shown in FIG. 2, the integrated circuit 210 may include multiple processor cores in some implementations. For example, the outer memory system 260 may include multiple layers.

The outer memory system 260 includes a memory protection circuit 270 configured to check for memory protection violations with a protection granule. The memory protection circuit 270 may allow the privileged software to define memory regions and assign memory access permission to each of them. The protection granule of the memory protection circuit 270 limits the size and thus resolution of these memory regions with associated access permissions. For example, the protection granule may correspond to pages of memory (e.g., 4 kB or 8 kB pages). In some implementations, the memory protection circuit 270 also specifies memory attributes for these memory regions, which may specify the ordering and merging behaviors of these regions, as well as caching and buffering attributes. The memory protection circuit 270 may be used to monitor transactions, including instruction fetches and data accesses by the processor core 220, which can trigger a fault exception when a memory protection violation is detected. For example, an attempt to access unauthorized memory may result in a hardware fault (e.g., a segmentation fault, storage violation exception, or abnormal termination of the offending process). The memory protection circuit 270 may serve to prevent a process from accessing memory that has not been allocated to it, which may prevent a bug or malware within a process from affecting other processes, or the operating system.

The memory protection circuit 270 may be of various sizes and complexities. In some implementations, the memory protection circuit 270 is configured to check two addresses per clock cycle. For example, the memory protection circuit 270 may have two address ports that allow it to receive two addresses and independently check both of the two addresses in memory for a memory protection violation during a single clock cycle. For example, an address may be checked by comparing a memory protection key or ring for a memory region that includes the address to a memory protection key or ring number associated with a process that is being executed by the processor core 220 and is attempting to access the memory at the address. In some implementations, the memory protection circuit 270 is configured to check a single address per clock cycle, and thus may occupy less circuit area and consume less power. In some implementations, the memory protection circuit 270 may have more than two address ports or otherwise be configured to check more than two addresses or ranges of addresses per clock cycle for memory protection violations.

The pipeline 230 includes a vector partition circuit 280. The vector partition circuit 280 may be configured to partition a vector being accessed in memory to allow for memory protection scanning for subvectors to be performed in parallel with memory access for other subvectors of the vector and increase the throughput for vector memory instructions. The vector partition circuit 280 may be configured to determine a maximum length, greater than one, corresponding to a number of vector elements to be accessed in a single clock cycle. The maximum length may be determined based on the protection granule and a stride of a vector that is identified by a vector memory instruction (e.g., the vector load instruction 310 or the vector store instruction 330). For example, the maximum length may be directly proportional to the protection granule and inversely proportional to the stride. For example, the maximum length may be determined as g/s, where g is the protection granule (e.g., in bytes) and s is the stride (e.g., in bytes) of the vector. In some implementations, the maximum length is constrained to be a power of two (e.g., the largest power of two less than or equal to g/s). The maximum length may also depend on the element width of the vector. The maximum length may also depend on the machine width of the pipeline 230, i.e., how many elements of a vector the pipeline can process per clock cycle. For example, maximum length may be determined as min(w, (g/s)), where w is the machine width of the pipeline 230. For example, the vector may be a unit-stride vector such that the stride is one. For example, the vector may have a constant stride that is greater than one (e.g., the stride may correspond to the length of a row in a matrix to access a column vector of a matrix data structure that is stored as a sequence of rows). The vector partition circuit 280 may be configured to partition the vector into a subvector of the maximum length and one or more additional subvectors with lengths less than or equal to the maximum length. The vector partition circuit 280 may be configured to check, using the memory protection circuit 270, whether accessing elements of the subvector will cause a memory protection violation. The vector partition circuit 280 may be configured to access the elements of the subvector before checking, using the memory protection circuit 270, whether accessing elements of one of the one or more additional subvectors will cause a memory protection violation. For example, the vector partition circuit 280 may be part of an execution stage of the pipeline 230.

In some implementations, the memory protection circuit 270 is configured to check two addresses per clock cycle, and the vector partition circuit 280 checks whether accessing elements of the subvector will cause a memory protection violation by inputting, during a single clock cycle, an address of a first element of the subvector and an address of a last element of the subvector to the memory protection circuit 270. In some implementations, the memory protection circuit 270 is configured to check a single address per clock cycle, and the vector partition circuit 280 is configured to determine the maximum length based on a base address of the vector. For example, taking the base address for vector into account may enable the determination of a partition of the vector into subvectors aligned with protection granule boundaries in memory to ensure that a subvector is contained within a single protection granule and thus can be checked for memory protection violations with a single reference to the memory protection circuit 270 using an address associated with any of the elements of the subvector.

For example, the integrated circuit 210 may be configured to, responsive to detection of a memory protection violation associated with an element of one of the one or more additional subvectors, raise an exception. In some implementations, raising the exception may halt execution in the processor core 220. In some implementations, raising the exception may cause a page to be brought in from a disk.

Figure 3:
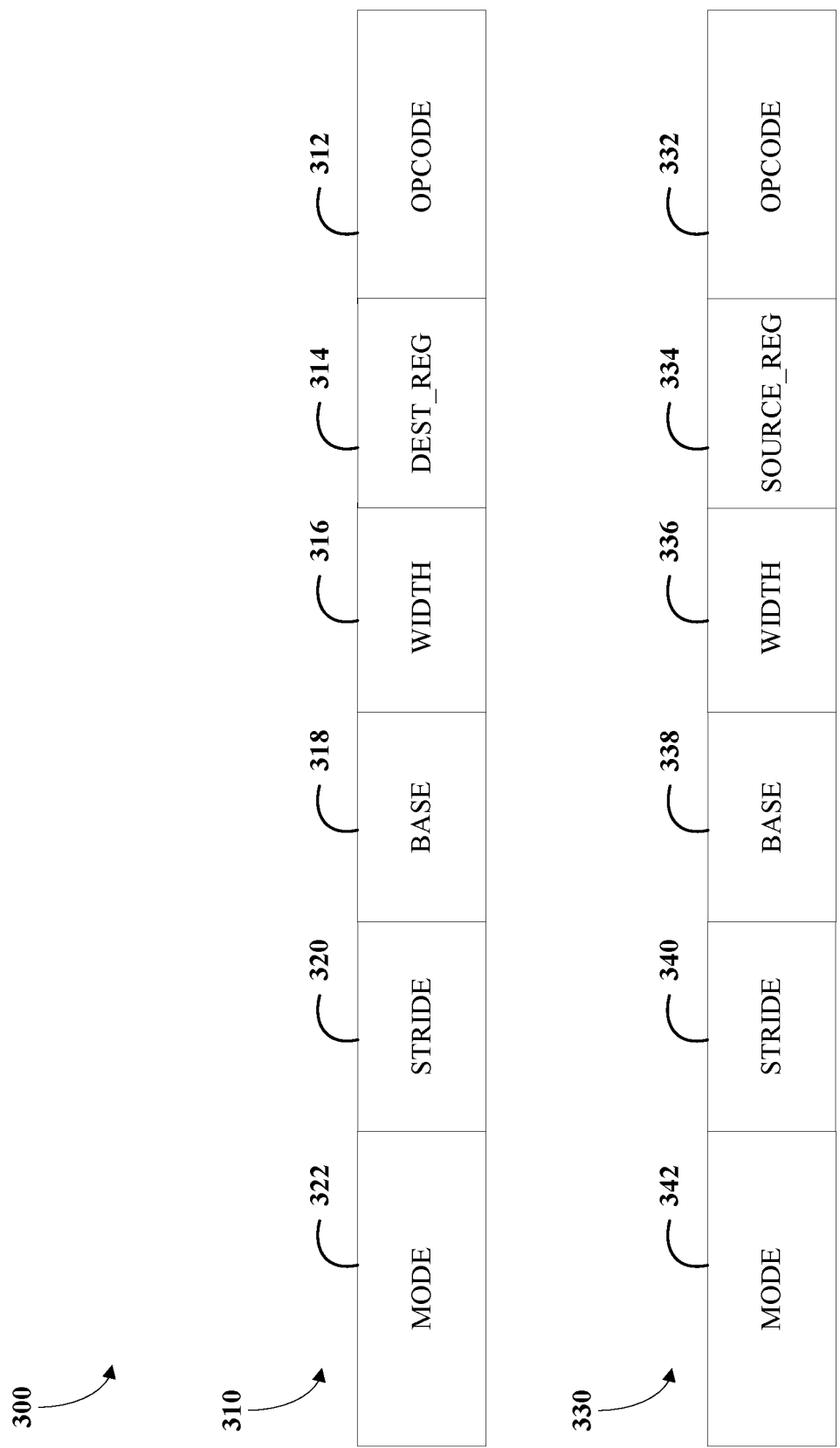
FIG. 3 is a memory map of examples of vector memory instructions.

FIG. 3 is a memory map of examples vector memory instructions 300 that includes a vector load instruction 310 and a vector store instruction 330. The vector load instruction 310 includes an opcode 312, a destination register field 314 that identifies an architectural register to be used to store a result of the vector load instruction 310, a width field 316 that specifies the size of memory elements of a vector being loaded from memory, a base register field 318 that identifies an architectural register that stores a base address for the vector in memory, a stride register field 320 that identifies an architectural register that stores a stride (e.g., one for a unit-stride vector load or a another constant stride) for the vector in memory, and a mode field 322 that specifies additional or optional parameters (e.g., including a memory addressing mode and/or a number of fields in each segment) for the vector load instruction 310. The vector store instruction 330 includes an opcode 332, a source register field 334 that identifies an architectural register holding vector data for storage, a width field 336 that specifies the size of memory elements of a vector being stored in memory, a base register field 338 that identifies an architectural register that stores a base address for the vector in memory, a stride register field 340 that identifies an architectural register that stores a stride for the vector in memory, and a mode field 342 that specifies additional or optional parameters (e.g., including a memory addressing mode and/or a number of fields in each segment) for the vector store instruction 330. For example, in a RISC-V processor core, the vector load instruction 310 may be a LOAD-FP instruction with a vector encoding extension and the vector store instruction 330 may be a STORE-FP instruction a vector encoding extension.

Figure 4:
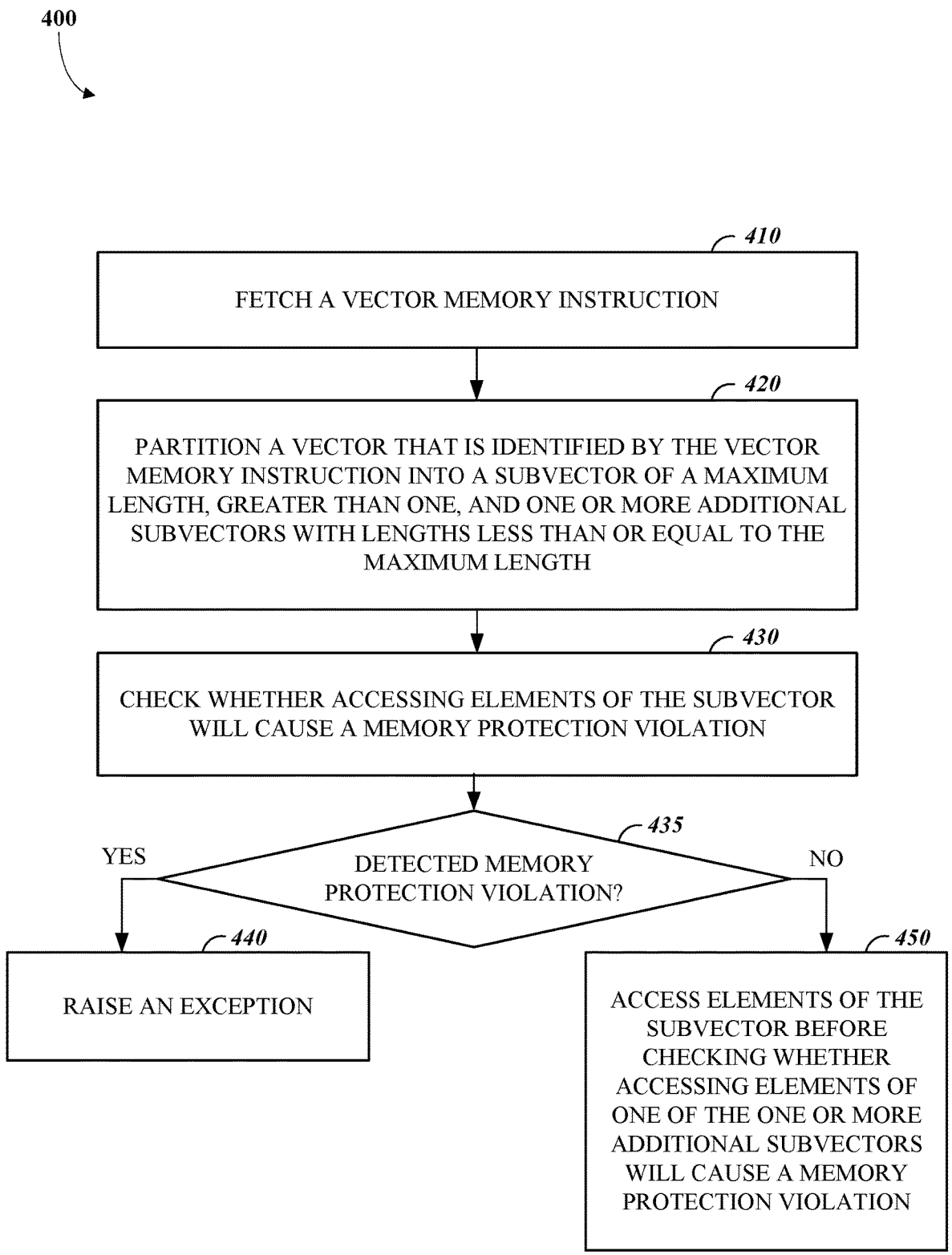
FIG. 4 is a flow chart of an example of a process for memory protection for vector operations.

FIG. 4 is a flow chart of an example of a process 400 for memory protection for vector operations. The process 400 includes fetching 410 a vector memory instruction using a processor core; partitioning 420 a vector that is identified by the vector memory instruction into a subvector of a maximum length, greater than one, and one or more additional subvectors with lengths less than or equal to the maximum length; checking 430 whether accessing elements of the subvector will cause a memory protection violation; if (at step 435) a memory protection violation is detected, then raising 440 an exception; and, if (at step 435) a memory protection violation is not detected, then accessing 450 the elements of the subvector before checking, using the memory protection circuit, whether accessing elements of one of the one or more additional subvectors will cause a memory protection violation. The process 400 may provide advantages over conventional techniques, such as, for example, enabling fast memory protection scanning for vector memory operations using a simple memory protection circuit that has small circuit area and power consumption. For example, the process 400 may be implemented using the integrated circuit 110 of FIG. 1. For example, the process 400 may be implemented using the integrated circuit 210 of FIG. 2.

The process 400 includes fetching 410 a vector memory instruction using a processor core (e.g., the processor core 220) including a pipeline configured to execute instructions, including constant-stride vector memory instructions. For example, the vector memory instruction may be the vector load instruction 310. For example, the vector memory instruction may be the vector store instruction 330. In some implementations, the vector memory instruction is fetched 410 from a memory (e.g., the memory 262) via one or more caches (e.g., the L1 instruction cache 250).

The process 400 includes partitioning 420 a vector that is identified by the vector memory instruction into a subvector of a maximum length, greater than one, and one or more additional subvectors with lengths less than or equal to the maximum length. For example, the vector may be identified in part by parameters of the vector memory instruction including a base address in memory, an element width, and/or a stride that specify where the vector is or will be stored in memory. In some implementations, the maximum length may be determined based on a protection granule and a stride of the vector (e.g., the vector load instruction 310 or the vector store instruction 330). For example, the process 400 may include determining the maximum length such that the maximum length is directly proportional to a protection granule of a memory protection circuit (e.g., the memory protection circuit 150) and inversely proportional to the stride of the vector. For example, the maximum length may be determined as g/s, where g is the protection granule (e.g., in bytes) and s is the stride (e.g., in bytes) of the vector. In some implementations, the maximum length is constrained to be a power of two (e.g., the largest power of two less than or equal to g/s). The maximum length may also depend on the element width of the vector. The maximum length may also depend on the machine width of the processor core executing the instruction, i.e., how many elements of a vector the processor core can process per clock cycle. For example, maximum length may be determined as min(w, (g/s)), where w is the machine width of the processor core. For example, the vector may be a unit-stride vector such that the stride is one. For example, the vector may have a constant stride that is greater than one (e.g., the stride may correspond to the length of a row in a matrix to access a column vector of a matrix data structure that is stored as a sequence of rows). In some implementations, the maximum length is determined based on a base address of the vector, which may enable alignment of subvectors resulting from partitioning 420 of the vector with protection granules in memory to ensure that all elements of a subvector are located in a single protection granule to simplify memory protection scanning for the subvectors. For example, this simplification may enable the use of a memory protection circuit that is configured to check a single address per clock cycle, which may therefore occupy less circuit area and consume less power.

The process 400 includes checking 430, using a memory protection circuit, whether accessing elements of the subvector will cause a memory protection violation. In some implementations, a memory protection circuit (e.g., the memory protection circuit 150) is configured to check two addresses per clock cycle, and checking 430 whether accessing elements of the subvector will cause a memory protection violation includes inputting, during a single clock cycle, an address of a first element of the subvector and an address of a last element of the subvector to the memory protection circuit. For example, this approach may be effective where the maximum length of the subvector ensures that the elements of the subvector can be located in no more than two adjacent protection granules. In some implementations, where the elements of the subvector are known to be in a single protection granule, checking 430 whether accessing elements of the subvector will cause a memory protection violation may be accomplished by inputting a single address associated with an element (e.g., the first element or any other element) of the subvector to a memory protection circuit. In some implementations, where larger subvectors are used, the complexity associated with checking 430 the elements of the subvector for memory protection violations may scale with the number of protection granules implicated. For example, a larger memory protection circuit with more input address ports may be used to check more elements per clock cycle to increase performance for execution of the vector memory instruction.

If (at step 435) a memory protection violation is detected, then responsive to detection of a memory protection violation associated with an element of the subvector, raising 440 an exception. In some implementations, raising the exception may halt execution in the processor core (e.g., the processor core 120). In some implementations, raising the exception may cause a page to be brought in from a disk to the memory (e.g., the memory 140 or the memory 142).

If (at step 435) a memory protection violation is not detected, then accessing 450 the elements of the subvector before checking (e.g., using the memory protection circuit 150), whether accessing elements of one of the one or more additional subvectors will cause a memory protection violation. For example, accessing 450 elements may include reading values of those elements from memory (e.g., from the memory 140) during execution of a vector load instruction. For example, accessing 450 elements may include writing values of those elements to memory (e.g., from the memory 140) during execution of a vector store instruction. The partitioning 420 of the vector into subvectors for memory protection scanning may thus enable more parallelism in the execution of the vector memory instruction and increase performance of the processing core. Although not explicitly shown in FIG. 4, the checking 430 of subvectors of the vector for memory protection violations may continue in series while previously checked 430 subvectors continue to be accessed 450 in memory by a subsequent stage in a pipeline of the processor core until all subvectors have been checked 430 and accessed 450 or an exception has been raised 440.

Figure 5:
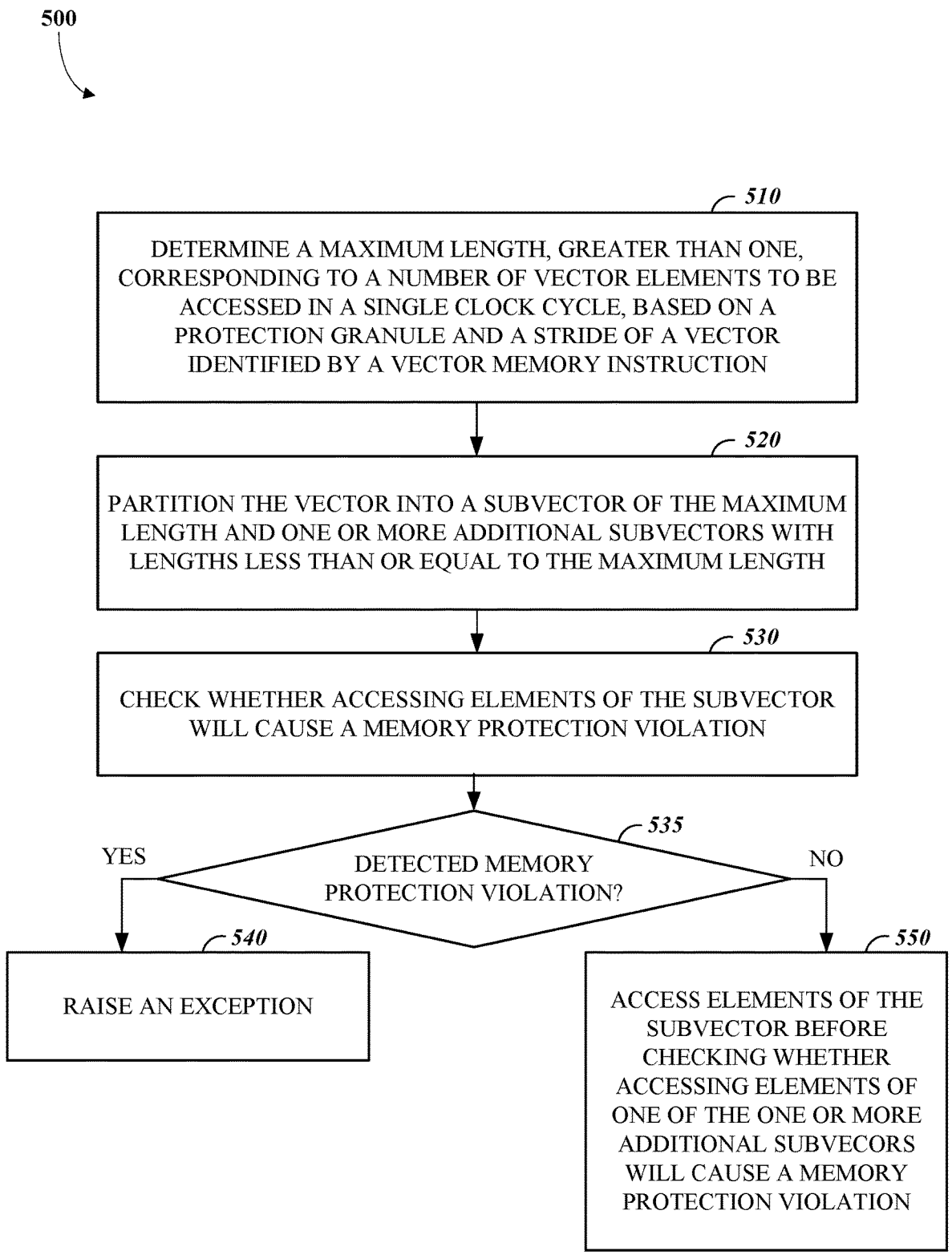
FIG. 5 is a flow chart of an example of a process for memory protection for vector operations.

FIG. 5 is a flow chart of an example of a process 500 for memory protection for vector operations. The process 500 includes determining 510 a maximum length, greater than one, corresponding to a number of vector elements to be accessed in a single clock cycle; partitioning 520 the vector into a subvector of the maximum length and one or more additional subvectors with lengths less than or equal to the maximum length; checking 530 whether accessing elements of the subvector will cause a memory protection violation; if (at step 535) a memory protection violation is detected, then raising 540 an exception; and, if (at step 535) a memory protection violation is not detected, then accessing 450 the elements of the subvector before checking, using the memory protection circuit, whether accessing elements of one of the one or more additional subvectors will cause a memory protection violation. The process 500 may provide advantages over conventional techniques, such as, for example, enabling fast memory protection scanning for vector memory operations using a simple memory protection circuit that has small circuit area and power consumption. For example, the process 500 may be implemented using the integrated circuit 110 of FIG. 1. For example, the process 500 may be implemented using the integrated circuit 210 of FIG. 2.

The process 500 includes determining 510 a maximum length, greater than one, corresponding to a number of vector elements to be accessed in a single clock cycle. The maximum length may be determined 510 based on a protection granule (e.g., a protection granule of the memory protection circuit 150) and a stride of a vector that is identified by a vector memory instruction. In some implementations, the maximum length is directly proportional to the protection granule and inversely proportional to the stride. For example, the maximum length may be determined 510 as g/s, where g is the protection granule (e.g., in bytes) and s is the stride (e.g., in bytes) of the vector. In some implementations, the maximum length is constrained to be a power of two (e.g., the largest power of two less than or equal to g/s). The maximum length may also depend on the element width of the vector. The maximum length may also depend on the machine width of the processor core executing the instruction, i.e., how many elements of a vector the processor core can process per clock cycle. For example, maximum length may be determined as min(w, (g/s)), where w is the machine width of the processor core. For example, the vector may be a unit-stride vector such that the stride is one. For example, the vector may have a constant stride that is greater than one (e.g., the stride may correspond to the length of a row in a matrix to access a column vector of a matrix data structure that is stored as a sequence of rows). In some implementations, the maximum length is determined 510 based on a base address of the vector, which may enable alignment of subvectors resulting from partitioning 520 of the vector with protection granules in memory to ensure that all elements of a subvector are located in a single protection granule to simplify memory protection scanning for the subvectors. For example, this simplification may enable the use of a memory protection circuit that is configured to check 530 a single address per clock cycle, which may therefore occupy less circuit area and consume less power.

The process 500 includes partitioning 520 the vector into a subvector of the maximum length and one or more additional subvectors with lengths less than or equal to the maximum length. In some implementations, partitioning 520 the vector includes assigning groups of maximum length consecutive elements of the vector to respective subvectors until all of the elements of the vector have been assigned to a subvector. For example, a subvector may have less elements than the maximum length if the number of elements in the vector is not divisible by the maximum length. In some implementations, partitioning 520 the vector includes assigning groups of consecutive elements of the vector with size less than or equal to the maximum length to respective subvectors, where each group is known (e.g., based on the base address of the vector and in turn the addresses of the elements in the group) to be located within the boundaries of a single protection granule of a memory protection circuit. For example, a subvector may have less elements than the maximum length if its first element or its last element are located far from a protection granule boundary.

The process 500 includes checking 530 (e.g., using a memory protection circuit) whether accessing elements of the subvector will cause a memory protection violation. In some implementations, a memory protection circuit (e.g., the memory protection circuit 150) is configured to check two addresses per clock cycle, and checking 530 whether accessing elements of the subvector will cause a memory protection violation includes inputting, during a single clock cycle, an address of a first element of the subvector and an address of a last element of the subvector to the memory protection circuit. For example, this approach may be effective where the maximum length of the subvector ensures that the elements of the subvector can be located in no more than two adjacent protection granules. In some implementations, where the elements of the subvector are known to be in a single protection granule, checking 530 whether accessing elements of the subvector will cause a memory protection violation may be accomplished by inputting a single address associated with an element (e.g., the first element or any other element) of the subvector to a memory protection circuit. In some implementations, where larger subvectors are used, the complexity associated with checking 530 the elements of the subvector for memory protection violations may scale with the number of protection granules implicated. For example, a larger memory protection circuit with more input address ports may be used to check more elements per clock cycle to increase performance for execution of the vector memory instruction.

If (at step 535) a memory protection violation is detected, then responsive to detection of a memory protection violation associated with an element of the subvector, raising 540 an exception. In some implementations, raising the exception may halt execution in the processor core (e.g., the processor core 120). In some implementations, raising the exception may cause a page to be brought in from a disk to the memory (e.g., the memory 140 or the memory 142).

If (at step 535) a memory protection violation is not detected, then accessing 550 the elements of the subvector before checking (e.g., using the memory protection circuit 150), whether accessing elements of one of the one or more additional subvectors will cause a memory protection violation. For example, accessing 550 elements may include reading values of those elements from memory (e.g., from the memory 140) during execution of a vector load instruction. For example, accessing 550 elements may include writing values of those elements to memory (e.g., from the memory 140) during execution of a vector store instruction. The partitioning 520 of the vector into subvectors for memory protection scanning may thus enable more parallelism in the execution of the vector memory instruction and increase performance of the processing core. Although not explicitly shown in FIG. 5, the checking 530 of subvectors of the vector for memory protection violations may continue in series while previously checked 530 subvectors continue to be accessed 550 in memory by a subsequent stage in a pipeline of the processor core until all subvectors have been checked 530 and accessed 550 or an exception has been raised 540.

Figure 6:
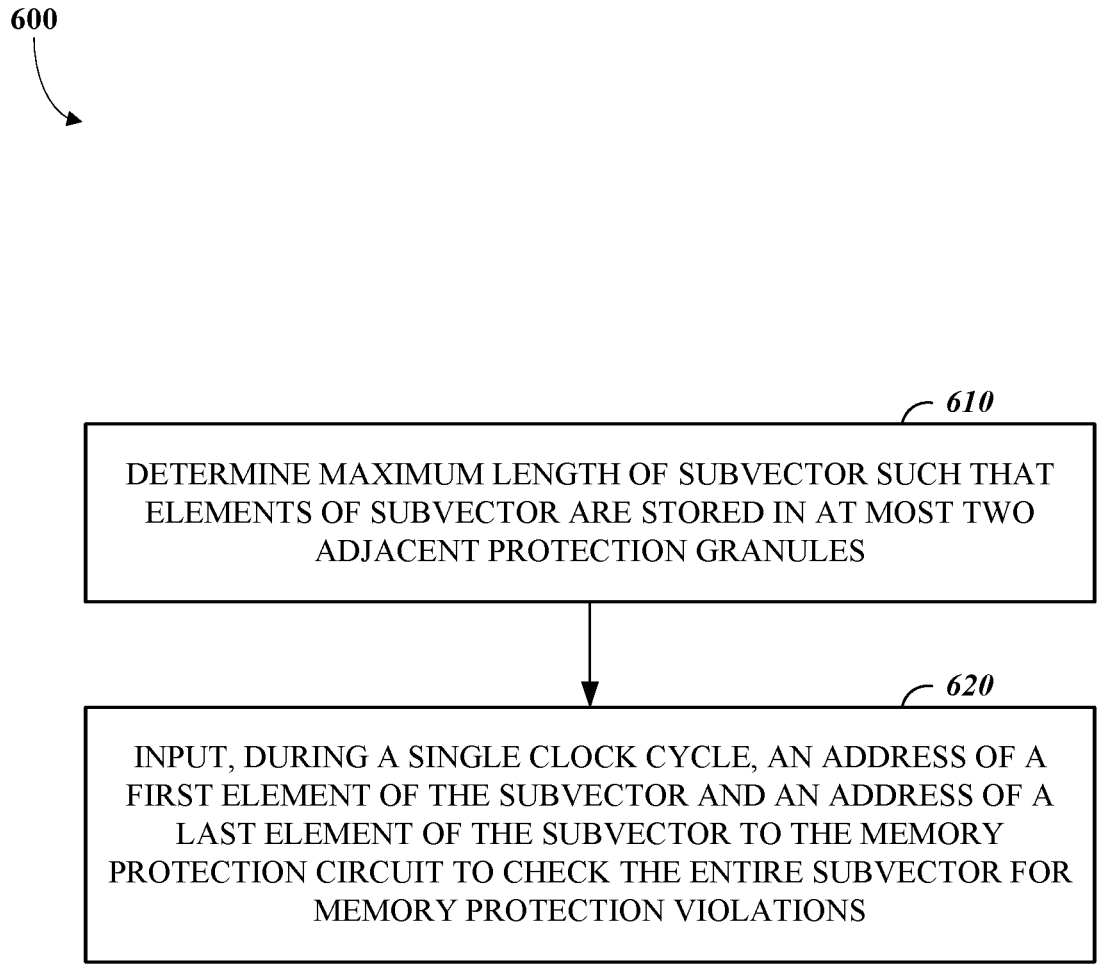
FIG. 6 is a flow chart of an example of a process for memory protection for vector operations using a memory protection circuit with two input address ports.

FIG. 6 is a flow chart of an example of a process 600 for memory protection for vector operations using a memory protection circuit with two input address ports. The process 600 includes determining 610 a maximum length of a subvector such that elements of the subvector are stored in at most two adjacent protection granules in memory; and inputting 620, during a single clock cycle, an address of a first element of the subvector and an address of a last element of the subvector to check the entire subvector for memory protection violations. By limiting the size of subvectors for processing in a partition a vector, the complexity of performing a memory protection scan for each subvector may be reduced. By tailoring the limit on the size of subvectors to a memory protection granule of the memory protection circuit and the stride and/or element width of the vector, the parallelism and performance of execution of vector memory instructions may be increased. The process 600 may provide advantages over conventional techniques, such as, for example, enabling fast memory protection scanning for vector memory operations using a simple memory protection circuit that has small circuit area and power consumption. For example, the process 600 may be implemented using the integrated circuit 110 of FIG. 1. For example, the process 600 may be implemented using the integrated circuit 210 of FIG. 2.

Figure 7:
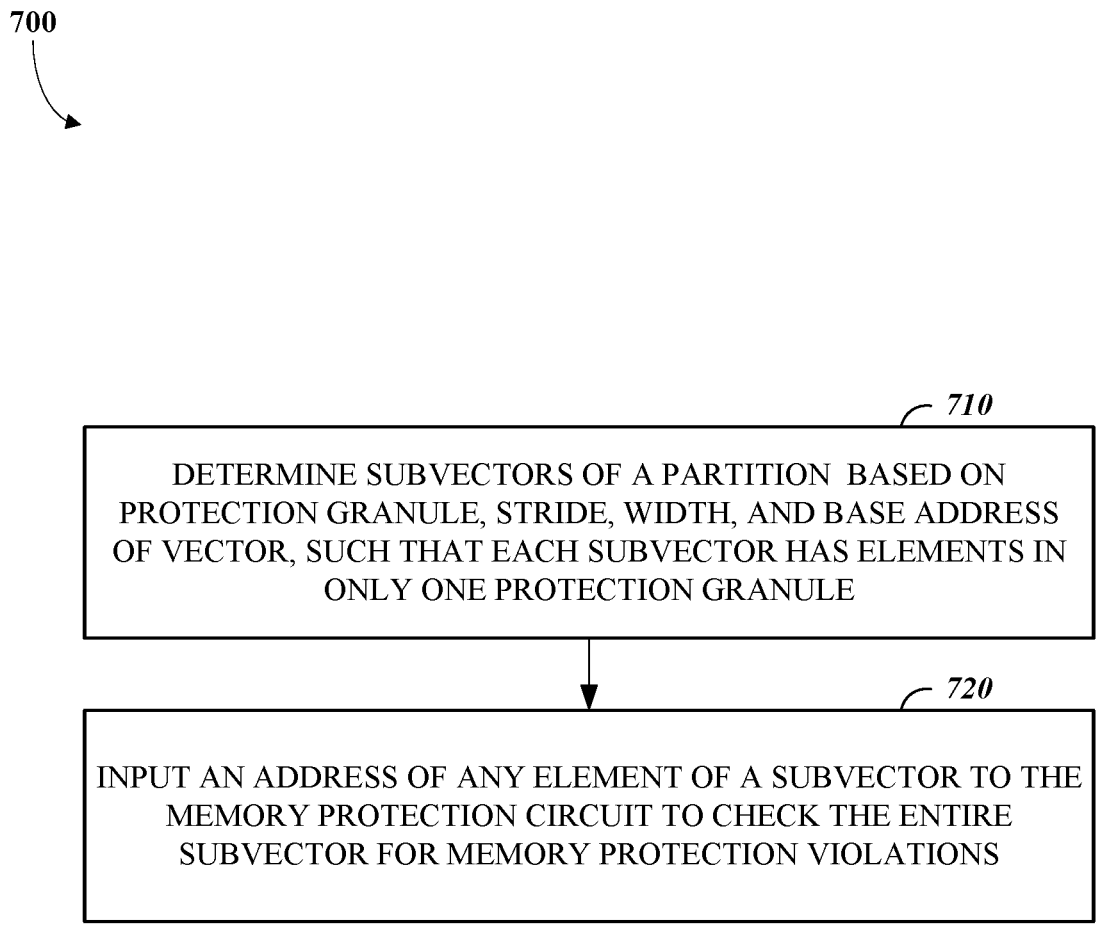
FIG. 7 is a flow chart of an example of a process for memory protection for vector operations using a memory protection circuit with a single input address port.

FIG. 7 is a flow chart of an example of a process 700 for memory protection for vector operations using a memory protection circuit with a single input address port. The process 700 includes determining 710 subvectors of a partition based on a protection granule of the memory protection circuit and a stride, width, and based address of a vector, such that each subvector has elements in only one protection granule in memory; and inputting 720 an address of any element (e.g., a first element) of a subvector to the memory protection circuit to check the entire subvector for memory protection violations. By comparing addresses of the elements of the vector to addresses corresponding to boundaries of protection granules of the memory protection circuit, a partition may be determined 710 to ensure all elements of a subvector are located within a single protection granule. This may reduce complexity of the memory protection scan for each subvector. The process 700 may provide advantages over conventional techniques, such as, for example, enabling fast memory protection scanning for vector memory operations using a simple memory protection circuit that has small circuit area and power consumption. For example, the process 700 may be implemented using the integrated circuit 110 of FIG. 1. For example, the process 700 may be implemented using the integrated circuit 210 of FIG. 2.

In a first aspect, the subject matter described in this specification can be embodied in an integrated circuit for executing instructions that includes a processor core including a pipeline configured to execute instructions, including constant-stride vector memory instructions; a memory protection circuit configured to check for memory protection violations with a protection granule; and a vector partition circuit. The vector partition circuit is configured to: determine a maximum length, greater than one, corresponding to a number of vector elements to be accessed in a single clock cycle, wherein the maximum length is determined based on the protection granule and a stride of a vector that is identified by a vector memory instruction; partition the vector into a subvector of the maximum length and one or more additional subvectors with lengths less than or equal to the maximum length; check, using the memory protection circuit, whether accessing elements of the subvector will cause a memory protection violation; and access the elements of the subvector before checking, using the memory protection circuit, whether accessing elements of one of the one or more additional subvectors will cause a memory protection violation.

In a second aspect, the subject matter described in this specification can be embodied in methods that include fetching a vector memory instruction using a processor core including a pipeline configured to execute instructions, including constant-stride vector memory instructions; partitioning a vector that is identified by the vector memory instruction into a subvector of a maximum length, greater than one, and one or more additional subvectors with lengths less than or equal to the maximum length; checking, using a memory protection circuit, whether accessing elements of the subvector will cause a memory protection violation; and accessing the elements of the subvector before checking, using the memory protection circuit, whether accessing elements of one of the one or more additional subvectors will cause a memory protection violation.

In a third aspect, the subject matter described in this specification can be embodied in an integrated circuit for executing instructions that includes a processor core including a pipeline configured to execute instructions, including constant-stride vector memory instructions; a memory protection circuit configured to check for memory protection violations with a protection granule; and a vector partition circuit. The vector partition circuit is configured to: partition a vector that is identified by a vector memory instruction into a subvector of a maximum length, greater than one, and one or more additional subvectors with lengths less than or equal to the maximum length; check, using the memory protection circuit, whether accessing elements of the subvector will cause a memory protection violation; and access the elements of the subvector before checking, using the memory protection circuit, whether accessing elements of one of the one or more additional subvectors will cause a memory protection violation.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit for executing instructions comprising:
 a processor core including a pipeline configured to execute instructions, including constant-stride vector memory instructions;
 a memory protection circuit configured to check for memory protection violations with a protection granule; and
 a vector partition circuit configured to:
  determine a maximum length, greater than one, corresponding to a number of vector elements to be accessed in a single clock cycle, wherein the maximum length is determined based on the protection granule and a stride of a vector that is identified by a vector memory instruction;
  partition the vector into a subvector of the maximum length and one or more additional subvectors with lengths less than or equal to the maximum length;
  check, using the memory protection circuit, whether accessing elements of the subvector will cause a memory protection violation; and
  access the elements of the subvector before checking, using the memory protection circuit, whether accessing elements of one of the one or more additional subvectors will cause a memory protection violation.

2. The integrated circuit of claim 1, in which the memory protection circuit is configured to check two addresses per clock cycle, and the vector partition circuit configuration for checking whether accessing elements of the subvector will cause a memory protection violation comprises further configuration for: inputting, during a single clock cycle, an address of a first element of the subvector and an address of a last element of the subvector to the memory protection circuit.

3. The integrated circuit of claim 1, in which the memory protection circuit is configured to check a single address per clock cycle, and the vector partition circuit is configured to:
 determine the maximum length based on a base address of the vector.

4. The integrated circuit of claim 1, in which the maximum length is directly proportional to the protection granule and inversely proportional to the stride.

5. The integrated circuit of claim 1, in which the maximum length is a power of two.

6. The integrated circuit of claim 1, in which the vector is a unit-stride vector such that the stride is one.

7. The integrated circuit of claim 1, in which the vector partition circuit is part of an execution stage of the pipeline.

8. The integrated circuit of claim 1, in which the integrated circuit is configured to:
 responsive to detection of a memory protection violation associated with an element of one of the one or more additional subvectors, raise an exception.

9. A method comprising:
 fetching a vector memory instruction using a processor core including a pipeline configured to execute instructions, including constant-stride vector memory instructions;
 partitioning a vector that is identified by the vector memory instruction into a subvector of a maximum length, greater than one, and one or more additional subvectors with lengths less than or equal to the maximum length;
 checking, using a memory protection circuit, whether accessing elements of the subvector will cause a memory protection violation; and
 accessing the elements of the subvector before checking, using the memory protection circuit, whether accessing elements of one of the one or more additional subvectors will cause a memory protection violation.

10. The method of claim 9, in which the memory protection circuit further checks two addresses per clock cycle, and checking whether accessing elements of the subvector will cause a memory protection violation comprises: inputting, during a single clock cycle, an address of a first element of the subvector and an address of a last element of the subvector to the memory protection circuit.

11. The method of claim 9, in which the memory protection circuit further checks a single address per clock cycle, and comprising: determining the maximum length based on a base address of the vector.

12. The method of claim 9, comprising: determining the maximum length such that the maximum length is directly proportional to a protection granule of the memory protection circuit and inversely proportional to a stride of the vector.

13. The method of claim 9, in which the maximum length is a power of two.

14. The method of claim 9, in which the vector is a unit-stride vector.

15. The method of claim 9, comprising: responsive to detection of a memory protection violation associated with an element of one of the one or more additional subvectors, raising an exception.

16. An integrated circuit for executing instructions comprising:
   a processor core including a pipeline configured to execute instructions, including constant-stride vector memory instructions;
   a memory protection circuit configured to check for memory protection violations with a protection granule; and
   a vector partition circuit configured to:
      partition a vector that is identified by a vector memory instruction into a subvector of a maximum length, greater than one, and one or more additional subvectors with lengths less than or equal to the maximum length;
      check, using the memory protection circuit, whether accessing elements of the subvector will cause a memory protection violation; and
      access the elements of the subvector before checking, using the memory protection circuit, whether accessing elements of one of the one or more additional subvectors will cause a memory protection violation.

17. The integrated circuit of claim 16, in which the memory protection circuit is configured to check two addresses per clock cycle, and the vector partition circuit configuration for checking whether accessing elements of the subvector will cause a memory protection violation comprises further configuration for: inputting, during a single clock cycle, an address of a first element of the subvector and an address of a last element of the subvector to the memory protection circuit.

18. The integrated circuit of claim 16, in which the memory protection circuit is configured to check a single address per clock cycle, and the vector partition circuit is configured to:
   determine the maximum length based on a base address of the vector.

19. The integrated circuit of claim 16, in which the vector partition circuit is configured to:
   determine the maximum length such that the maximum length is directly proportional to the protection granule and inversely proportional to a stride of the vector.

20. The integrated circuit of claim 16, in which the vector is a unit-stride vector.

21. The integrated circuit of claim 16, in which the maximum length is a power of two.

22. The integrated circuit of claim 16, in which the vector partition circuit is part of an execution stage of the pipeline.

23. The integrated circuit of claim 16, in which the integrated circuit is configured to:
   responsive to detection of a memory protection violation associated with an element of one of the one or more additional subvectors, raise an exception.

* * * * *